United States Patent [19]

Berger

[11] 3,841,544

[45] Oct. 15, 1974

[54] BUMPER MOUNTED RACK

[76] Inventor: Irvin E. Berger, 4215 Grove St., Skokie, Ill. 60076

[22] Filed: Jan. 15, 1973

[21] Appl. No.: 323,868

[52] U.S. Cl. .......................................... 224/42.03 B
[51] Int. Cl. .......................................... B60m 9/10
[58] Field of Search 224/42.03 B, 42.03 R, 42.03 A, 224/42.06, 42.07, 42.08; 211/17, 18, 22; 248/228, 226 B, 227

[56] References Cited

UNITED STATES PATENTS

| | | | |
|---|---|---|---|
| 2,195,366 | 3/1940 | Haigh | 224/42.07 UX |
| 2,362,368 | 11/1944 | Gardella | 248/226 B |
| 2,432,732 | 12/1947 | Del Cano | 224/42.03 B |
| 2,512,267 | 6/1950 | Donnelley | 224/42.03 B |
| 2,867,402 | 1/1959 | Graybill et al. | 224/42.03 B X |
| 3,338,485 | 8/1967 | Van Leer et al. | 224/42.03 B |
| 3,765,581 | 10/1973 | Kosecoff | 224/42.03 B |

FOREIGN PATENTS OR APPLICATIONS

| | | | |
|---|---|---|---|
| 148,372 | 1/1955 | Sweden | 224/42.03 B |

*Primary Examiner*—Robert G. Sheridan
*Assistant Examiner*—Jerold M. Forsberg
*Attorney, Agent, or Firm*—Norman Lettvin

[57] ABSTRACT

A bumper-mounted rack for support of bicycles and the like is provided with upright elongated legs that are each pivotally mounted relative to their longitudinal axis, while the legs are selectively longitudinally extensible relative to the cross-brace of the rack and bracket means carried by the legs are independently selectively positionable longitudinally of the legs. The bracket means include a unique and versatile bracket constructed and shaped for selective engagement with most automobile bumpers in use today.

4 Claims, 8 Drawing Figures

26 14 44 22 24 T 12 10 16 18 20 A 16 B 16 20

26
14
44
22
24
T
12
10
16
18
20
A
16
B
16
20

12a
44
12c
18
12d
44
50
46
48
47
12b
12c
12
12a
16a
16b 26
38
38
40
T 34
14
42
38
40
T
26
38
40
38

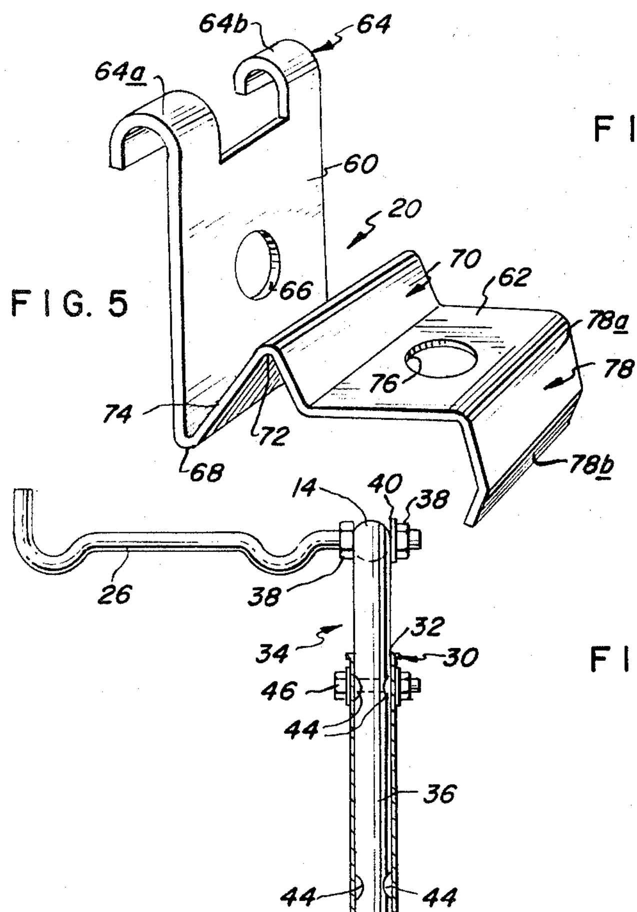
FIG. 5
64b
64
64a
60
20
66
70
62
78a
78
76
74
72
68
78b
14
40
38
26
38
32
34
30
46
44
36
44
44
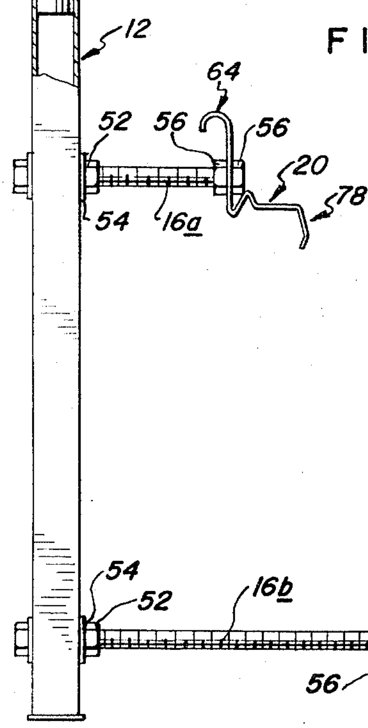
FIG. 3
12
64
52
56
56
20
78
54
16a
54
52
16b
78
20
56
56
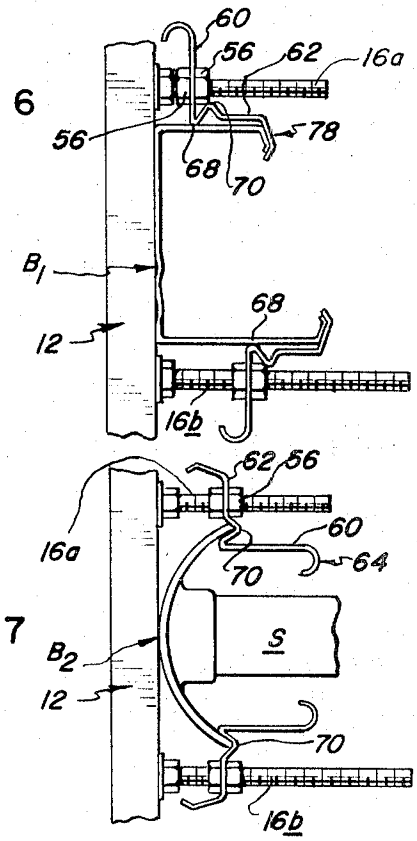
FIG. 6
60
56
62
16a
56
78
68
70
B1
12
68
16b
FIG. 7
62
56
16a
60
70
64
S
B2
12
70
16b
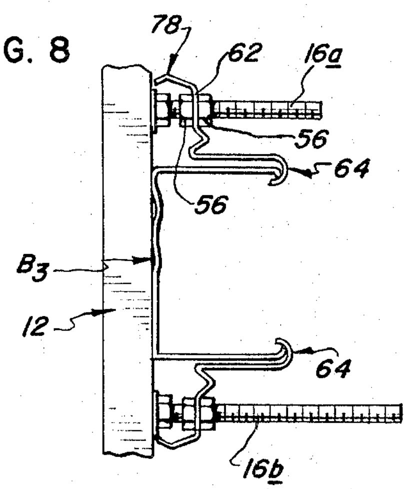
FIG. 8
78
62
16a
56
64
56
B3
12
64
16b

BUMPER MOUNTED RACK

BACKGROUND OF THE INVENTION

This invention relates to racks and more particularly to a bumper-mounted rack and to an improved bumper-gripping bracket therefor.

It has been known to provide a detachable rack that may be selectively secured, wholly or partially, to an automobile's bumper to provide a carrier for articles such as bicycles. However, because of the multiplicity of models of automobiles having bumpers of different cross-sectional shape and vertical height, and differing elevations of the bumper relative to the ground, it has been a problem to provide a bumper-mounted rack of substantially universal adaptability to the various shapes and styles of automobile bumpers. Furthermore, bowing of a bumper, or lack of linearity of the longitudinal edges thereof, poses still another problem of providing a rack that is adaptable for most effective attachment to such a bumper.

Heretofore, these problems of adaptability of a detachable carrier rack to different automobile bumpers have required the providing of a plurality of differently shaped bumper-gripping brackets for different vehicles, but it is evident that such a solution is uneconomic as it requires maintenance of stocks of a plurality of differently shaped brackets, and substantial time and expense may be involved in supplying proper brackets to dissatisfied customers who find after purchase that the product does not quite fit the vehicle that they own.

Therefore, it is an object of this invention to provide an improved bumper-mounted rack that provides substantial universality of its adaptability for securement to a major number of the automobiles in use today in the United States.

Another object of this invention is to provide a bumper-mounted rack that is constructed and arranged for proper securement to bumpers having bowed or non-linear longitudinal edges to which the rack's connecting brackets are to attach.

A further object of this invention is to provide an improved bumper-gripping bracket that is shaped and arranged to provide multiple attitudes of connection thereof, so as to establish substantial universality of securement to bumpers found upon a majority of present day automobiles.

And another object is to provide a bumper-mounted rack that is characterized by substantial universality of adaptability to many styles of automobiles, thereby providing a rack characterized by high utility and reduced follow-up cost to manufacturer and retailer alike by providing an effective product acceptable to the great majority of potential users thereof.

Further objects and advantages will become apparent to those skilled in the art from the following description of a preferred embodiment of my invention.

BRIEF DESCRIPTION OF THE DRAWINGS

FIG. 3 is a side elevational view of the rack of FIG. 2;

FIG. 5 is an enlarged perspective view showing the shape and arrangement of features of the improved bumper-gripping bracket;

FIGS. 6, 7 and 8 are illustrative views showing three different attitudes or arrangements of the bracket of FIG. 5 upon the transverse extensions carried by the legs of a rack's frame, arranged for use with three different shapes of bumpers.

DESCRIPTION OF THE PREFERRED EMBODIMENT

Figure 1:
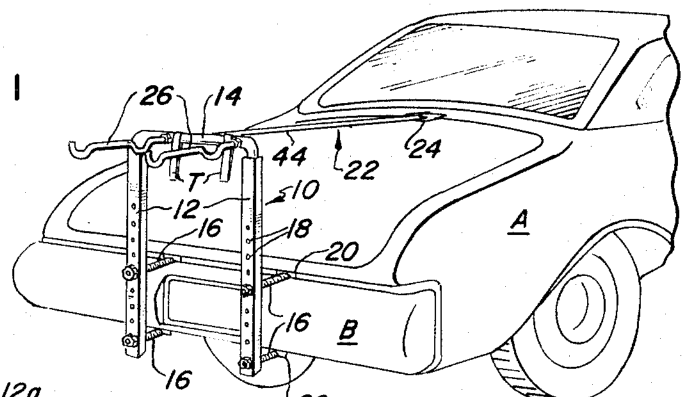
FIG. 1 is an illustrative perspective view of the rear end portion of an automobile having mounted on the bumper thereof a rack embodying the features of my invention.

Referring now to the drawings, the rear end fragment of an automobile is shown at A having a bumper B upon which is mounted a removable carrier rack, generally indicated at 10 and positioned to engage the rearmost edge of bumper B. The rack 10 includes: a generally planar frame, consisting of two elongated, parallel, upright rack legs 12 spaced by a bight, or transverse upper cross-brace member 14; four forwardly extending elongated extensions 16 arranged to be selectively mountable in apertures 18 on legs 12 and carrying bumper-engaging brackets 20 for edge-gripping a bumper; forwardly extending flexible strap-like tensioning means 22 extending between cross-brace member 14 and a bracket 24 that is adapted to conveniently connect to the vehicle's trunk lid; and a pair of rearwardly extending, shaped, bicycle-supports 26 cantilevered from the cross-brace member 14. Racks including the mechanical equivalents of such general construction features, but not providing identical elements, are known in the prior art. The combinations and/or features that constitute the improvements herein are detailed in FIGS. 2–8 and as hereinafter described.

Figure 4:
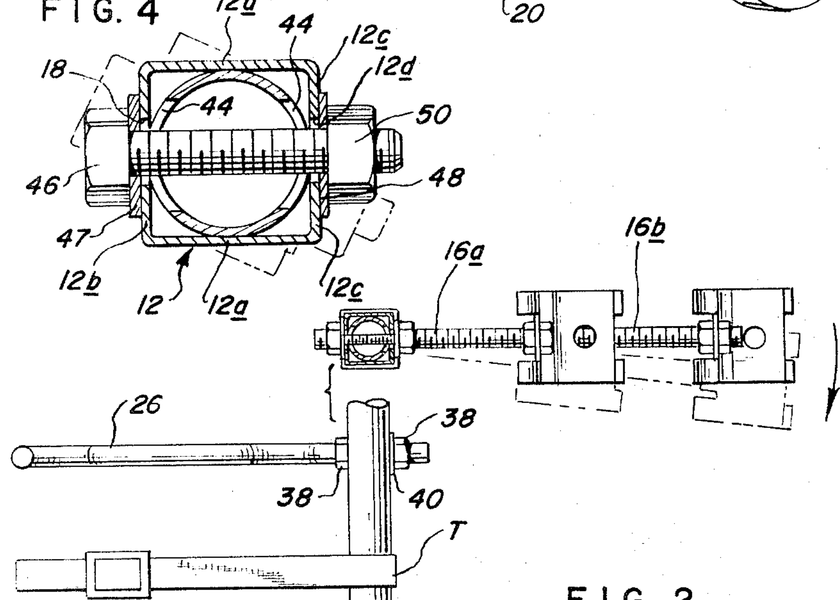
FIG. 4 is an enlarged cross-sectional view through one upright leg of the rack's frame showing details of the connection of the frame leg to the leg of the rack's bight, and illustrating a measure of the range of pivoting of the upright leg between the normal position shown in full lines and one extreme position shown in broken lines.
Figure 2:
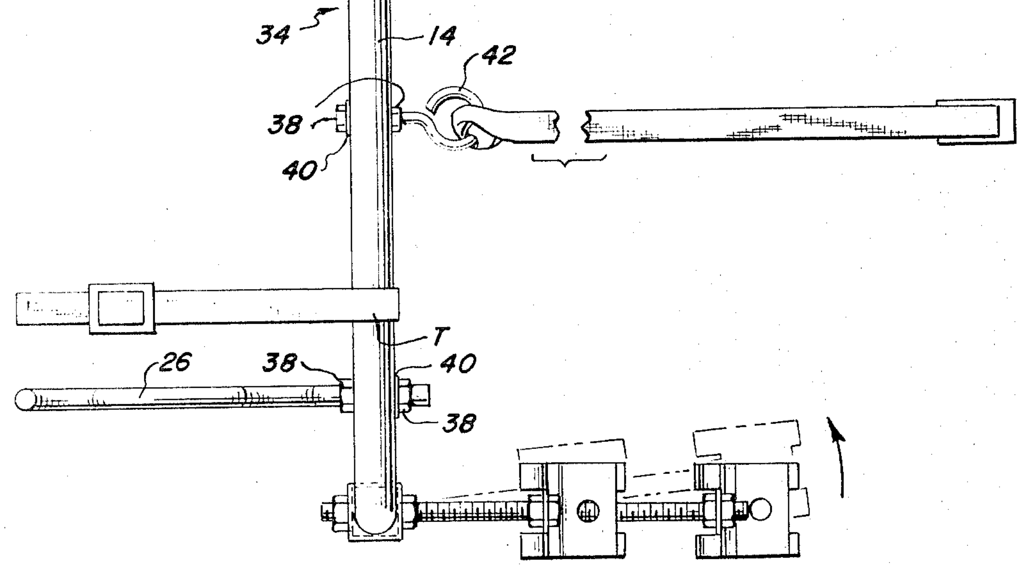
FIG. 2 is a fragmentary, and partially cross-sectioned, but essentially top-plan view of the rack shown in FIG. 1, and illustrating in broken lines part of the range of pivoting of the rack legs.

Each elongated rack leg 12 is formed to provide, in crosssection as best seen in FIGS. 2 and 4, a polygonal, preferably square, hollow body that includes two spaced sides **12*a* interconnected by a continuous rearwardly facing side 12*b*, and a pair of forwardly facing flanges 12*c* turned in from sides 12*a* with free longitudinal edges spaced from each other to provide a continuous slot 12*d* along the length of leg 12. The side 12*b* is provided with a series, or plurality, of centrally spaced apertures 18 aligned with slot 12*d* with the diameter of aperture 18 substantially the same as the width of slot 12*d*.**

The upper end, at least, and preferably both ends of rack leg 12 has a centrally apertured means secured adjacent thereto. More specifically, a cap member 30 with a central circular aperture 32 therein is welded to the end edge of rack leg 12 providing desirable rigidification of the slotted leg body and providing, by the edge of aperture 32, a journal for a pivot stem hereinafter described.

The cross-brace member 14 is only the bight portion of a U-shaped tubular part 34 whose U-shape provides spaced parallel legs 36 that telescope into rack legs 12 through journal apertures 32. Attached to the bight of part 34, that is appropriately apertured to receive threaded stud portions for carrying thereon spaced clamp nuts 38 and lock washers 40, are a single forward-extending, centrally mounted, hook-eye 42 to which a single tensioning strap 44 ties or otherwise connects, and a pair of rearwardly extending bicycle supports 26.

The legs 36 of U-shaped part 34 are elongated and provided with a plurality of longitudinally spaced and diametrically arranged pairs of apertures 44. Each aperture 44 has a vertical size of substantially the same diameter as the diameter of aperture 18 and an arcuately elongated shape the comparative size of which can be best seen in FIG. 4. When one pair of apertures 44 are aligned with an aperture 18 and the slot 12*d*, then a pin-like member, such as the stem of headed bolt 46 will extend through all such aligned openings to provide a connection that secures rack leg 12 to leg 36 of part 34 while permitting pivoting of leg 12 within the range permitted by the arcuate elongation of apertures 44 and with leg 36 serving as the central support stem for journal opening 32. As seen in FIG. 4, the entire connection between leg 36 and rack leg 12 includes a headed bolt 46 with a threaded stem, a washer 47 between the bolt head and rack side 12*b*, a split spring-like lock washer 48 of a size spanning slot 12*d*, and a nut 50.

The plurality of pairs of apertures 44 permits of selective vertical spacing of the bight of U-part 34 relative to the upper ends of rack legs 12. This feature may be used to locate bicycle supports 26 at different spacings from bumper B as may be required to accommodate bicycle frames of different sizes, or to insure clearance of the bicycles from the ground. A pair of flexible strap-like tie members T are carried on bight 34 available for aiding in tie-down securing of bicycles upon the rack 10.

For securement of the rack 10 to a bumper B, each rack leg 12 is provided with an upper and lower elongated rod-like extensions 16*a* and 16*b* that are carried in a spaced aperture 18 and extend transversely and forwardly of the rack leg. Preferably the extensions are elongated headed bolts whose entire stem is threaded, and with the stem of lower extension 16*b* being longer than the stem of 16*a*. The threaded stems provide convenient means for pressure-clamping thereof by nut 52 and washer 54 against the flanges 12*c* to hold the stems at selected attitudes transverse to rack leg 12, and for selective positioning of brackets 20 longitudinally therealong by utilizing a pair of nuts 56 for fixing the longitudinal position of the bracket 20 while permitting pivoting of bracket 20 about the axis of the stem.

FIG. 5 discloses an improved form and shape of bumper-engaging bracket 20 formed of sheet metal and adapted for selective edge-hooking onto bumpers of different configuration. Bracket 20 is of generally angle-shaped form in cross-section and provides two generally flat portions 60 and 62 each located in one leg of the angle and spaced from the free edge of each leg. The first angle leg containing flat portion 60 has at its free edge an out-turned, rounded, hook section 64 of approximately 180° arc in cross-section. The hook section 64 may be provided by two laterally-shaped sections 64*a* and 64*b*. An aperture 66 is provided in flat portion 60. Between the bend 68, at the junction of the angle legs, and flat portion 62, and therefore between the pair of flat portions 60 and 62, there is formed a third hook section 70 whose bumper engaging edge 72 is of acute angle shape and is defined in the outer surface of the bracket. This construction provides a section 74 that projects so as to overlie part of flat portion 60. The aperture 66 is located so that a projection thereof perpendicular to flat portion 60 is spaced from and clear third hook section 70. The flat portion 62 of the second angle leg has an aperture 76 therein. The free edge of the second angle leg is provided with an out-turned, second hook 78 that has flatted sections 78*a* and 78*b* angled to each other as shown.

FIGS. 6, 7 and 8 illustrate diagrammetically how bracket 20 is utilized and cooperates with different shaped bumpers. In FIG. 6 the bumper $B_1$ there indicated in cross-section is that of Cadillacs, Eldorados and 1967–1973 Buicks. In FIG. 7 the bumper $B_2$ there indicated in cross-section is that of Volkswagen and many foreign-made compacts. In FIG. 8 the bumper $B_3$ there indicated in cross-section is that of all General Motors cars (except those shown in FIG. 6 as $B_1$), all Fords, American Motors' cars and U.S.-made compacts.

As illustrated in FIG. 6, the bracket 20 is mounted through flat portion 60 being secured to the stem of an extension rod 16 with second hook 78 positioned for edge-gripping of the forwardmost edges of bumper $B_1$. In the attitude shown, the junction bend 68 lies closest to the upper and lower surfaces of the bumper $B_1$, with flat portion 62 spaced from the adjacent bumper surfaces. The nuts 56 adjacent the aperture 66 in flat portion 60 clear the hook section 70 that is displaced inwardly from flat portion 62. Because of the shape of bumper $B_1$, the upper bracket 20 is located closer to rack leg 12 than is lower bracket 20 on extension rod 16*b*.

In FIG. 7, the upper and lower brackets 20 are located substantially equidistant from rack leg 12, and each bracket is secured to its extension 16 through aperture 76 in flat portion 62, with the hook section 70 at an attitude so that bumper engaging edge 72 faces rearwardly. The hooks 64 are sufficiently small in size to avoid interference with a support S that centrally supports bumper $B_2$.

In FIG. 8, the upper and lower brackets 20 are again located substantially equidistant from rack leg 12, as indicated, and to conform with the shape of bumper $B_3$. Each bracket 20 is secured, as in FIG. 7, through aperture 76 in flat portion 62, but here the hooks 64 are the operative ones for edge-gripping of the bumper.

The series of apertures 18 permits greater spacing of the extensions 16 to accommodate different vertical heights of bumpers. The extensibility of cross-brace 14 vertically relative to rack legs 12 permits an adjustment of the height of supports 26 relative to the ground, depending upon the location of the bumper relative to the ground.

It will be seen from the foregong that various modifications and changes could be made to effect different embodiments of my rack without departing from the spirit and scope of this invention.

What is claimed and desired to be secured by Letters Patent of the United States is:

1. In a bumper-mounted rack of the type including a pair of spaced upright rack legs, a cross-brace means secured to and extending between said upright legs, and bumper-engaging brackets carried on elongated extensions supported by the rack legs and extending transversely of the plane of the upright legs and cross-brace means, the improvement comprising, in combination: at least one of the upright legs being secured to the cross-brace means through a pivotably adjustable connection that permits pivoting of the leg and the bumper-engaging brackets carried thereby about an axis in the plane defined by the legs and the cross-brace means, each bumper-engaging bracket being shaped to provide at least one apertured section, for securement of the bracket selectively longitudinally of the elongated extension supported by the rack leg, at least two differently shaped hook sections being provided on the bracket each adapted for engagement with the edge of a different shape of bumper, and each bumper-engaging bracket being shaped and arranged to provide two apertured sections and at least three differently shaped hook sections with one of the hook sections being located between the two apertured sections.

2. A rack as in claim 1 wherein each upright rack leg is an elongated, substantially tubular, member having a centrally apertured means rigidly secured thereto adjacent one end thereof to provide a pivot journal thereat, and wherein the cross-brace means is the bight portion of a U-shaped member whose spaced parallel legs telescope through the apertured means on the rack legs to provide stems that accommodate relative pivoting between each upright leg and the cross-brace means.

3. A rack as in claim 2 wherein the pivotably adjustable connection includes a pin-like member carried by a rack leg and extending transversely of the longitudinal axis of the rack leg, and the leg of the U-shaped member being tubular and having diametrically disposed and arcuately elongated apertures therein through which the pin-like member extends.

4. A rack as in claim 2 wherein each rack leg is provided with a plurality of longitudinally spaced apertures adapted to selectively adjustably receive the elongated extensions that carry the bumper-engaging brackets, and each leg of the U-ahaped member is provided with a plurality of longitudinally spaced apertures for adjustable, telescoping cooperation with the rack legs for selectively varying the effective spacing between the bight of the U-shaped member and the elongated extensions carried on the rack legs.

* * * * *